No. 623,651. Patented Apr. 25, 1899.
T. L. CAMP.
FIFTH WHEEL FOR ELECTRICAL VEHICLES.
(Application filed June 3, 1898.)
(No Model.) 2 Sheets—Sheet 1.
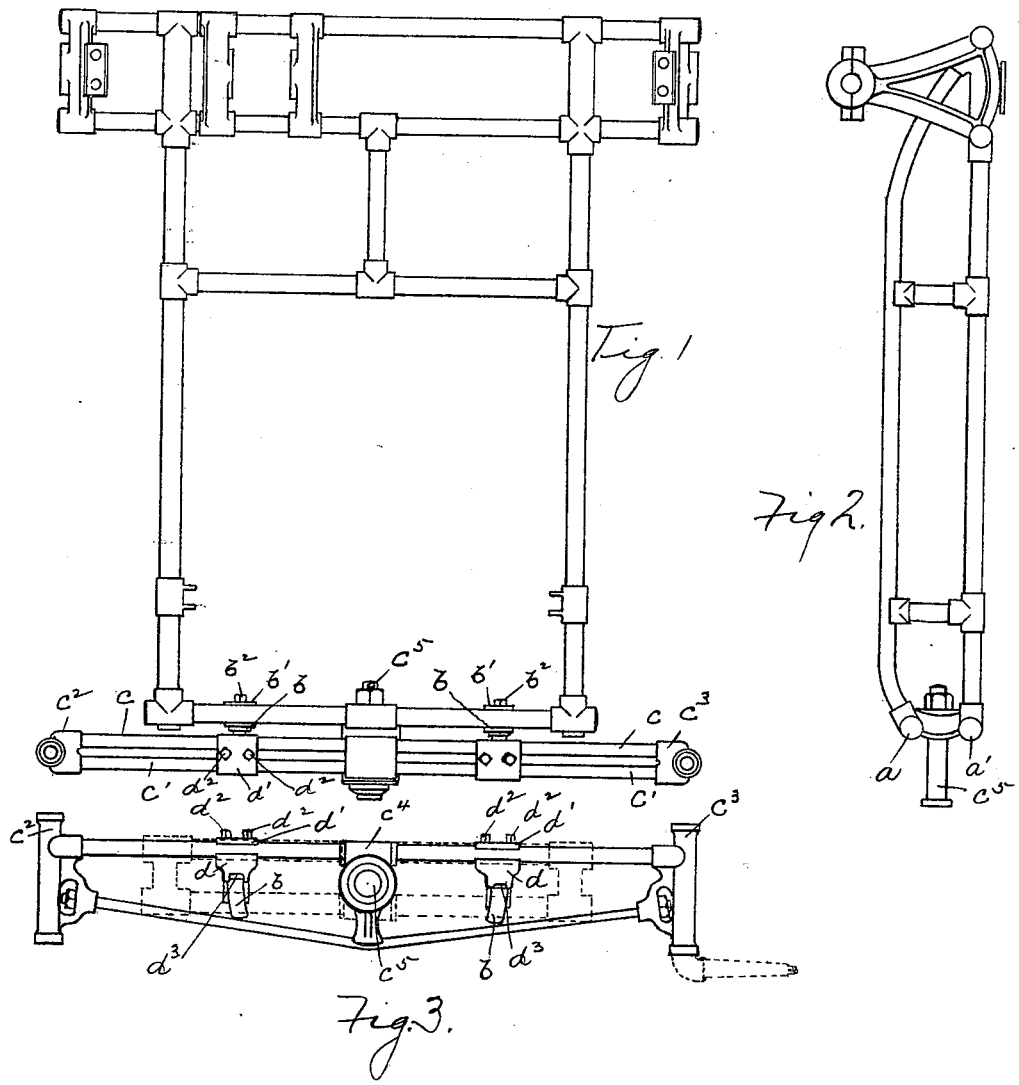

No. 623,651. Patented Apr. 25, 1899.
T. L. CAMP.
FIFTH WHEEL FOR ELECTRICAL VEHICLES.
(Application filed June 3, 1898.)
(No Model.) 2 Sheets—Sheet 2.
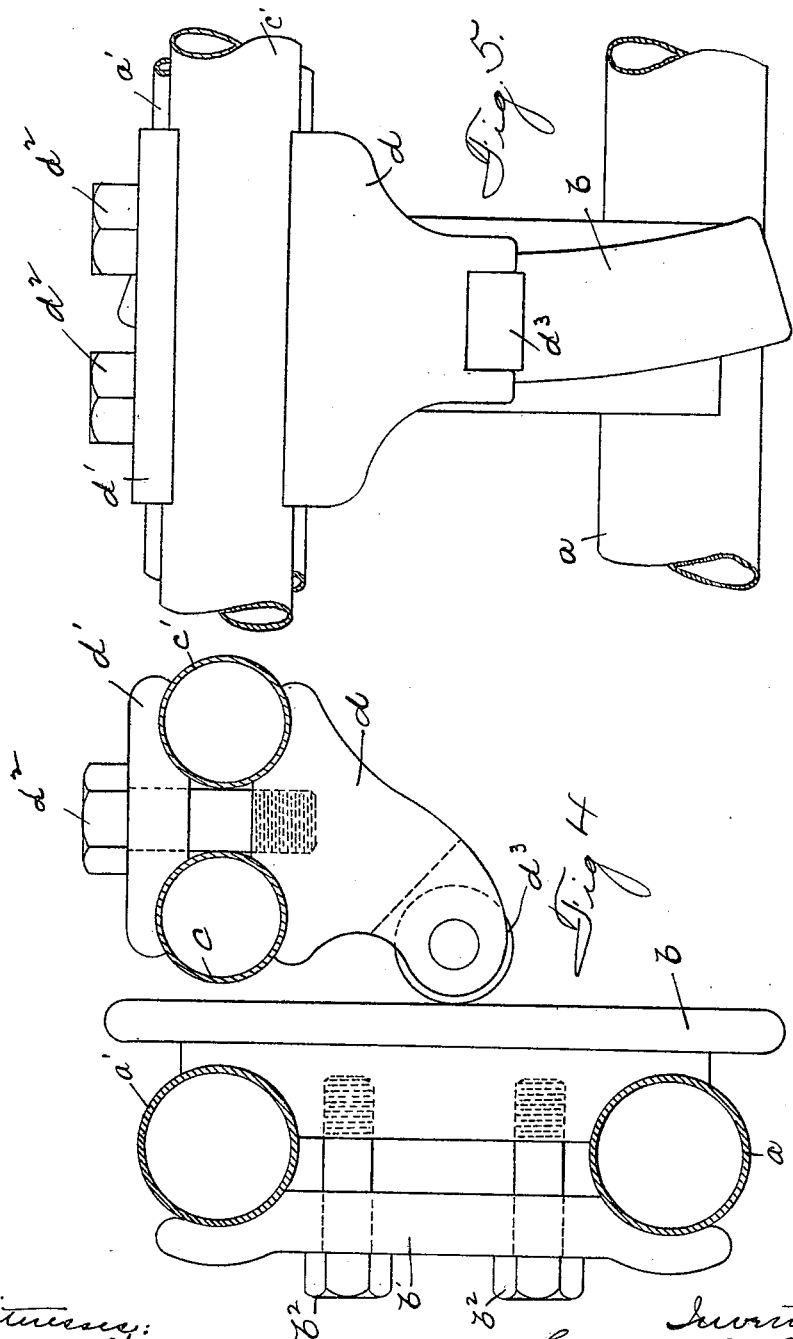

United States Patent Office.

THEODORE L. CAMP, OF CHICAGO, ILLINOIS, ASSIGNOR TO THE AMERICAN ELECTRIC VEHICLE COMPANY, OF SAME PLACE.

FIFTH-WHEEL FOR ELECTRICAL VEHICLES.

SPECIFICATION forming part of Letters Patent No. 623,651, dated April 25, 1899.

Application filed June 3, 1898. Serial No. 682,423. (No model.)

*To all whom it may concern:*

Be it known that I, THEODORE L. CAMP, a citizen of the United States, residing at Chicago, in the county of Cook and State of Illinois, have invented a certain new and useful Improvement in Vertical Fifth-Wheels for Electrical Vehicles, of which the following is a full, clear, concise, and exact description, reference being had to the accompanying drawings, forming a part of this specification.

My invention relates to a vertical fifth-wheel for electric vehicles, my object being to provide means for guiding the oscillating front axle of an electric vehicle to thereby remove the strain from the pin upon which the axle is journaled.

In accordance with my invention in the preferred form thereof I provide upon the frame of the vehicle a pair of guideways or tables, one upon each side of the pivot or journal, and upon the oscillating front axle I mount brackets, one opposite each of the guideways, each of the brackets carrying a roller adapted to rest against and ride upon the guideway, whereby the front axle during its oscillation is guided and the journal pin or pivot is relieved from any shock or strain to which it would otherwise be subjected. The construction thus constitutes a vertical fifth-wheel to accommodate and direct the vertical oscillation of the front axle.

I have illustrated my invention in the accompanying drawings, in which—

Figure 1 is a plan view of the frame of an electric vehicle embodying my invention. Fig. 2 is a side view thereof. Fig. 3 is an end view showing the front axle in elevation. Fig. 4 is a view showing the details of the rollers and their guides. Fig. 5 is a view thereof as seen from the front of the vehicle.

Like letters refer to like parts in the several figures.

The front transverse member of the frame, as illustrated, comprises two tubes $a$ $a'$, situated one above the other, and a guide or table $b$ is clamped against the front faces thereof through the agency of the plate $b'$, resting against the rear faces of said tubes and clamped to the table $b$ by means of bolts $b^2$ $b^2$. The front axle comprises tubes $c$ $c'$, extending between and joining the end brackets $c^2$ $c^3$ with the central bracket $c^4$, through which passes the journal-pin $c^5$, about which the front axle oscillates. Against the under faces of the tubes $c$ $c'$ rests the bracket $d$, which is clamped against the tubes through the agency of a plate $d'$, resting against the upper face of the tube and clamped in position by means of bolts $d^2$ $d^2$, screwing into the bracket $d$. In the lower end of the bracket is journaled a roller $d^3$, adapted to engage and roll upon the table $b$ as the axle oscillates. The surface of the table $b$ is curved, as illustrated in Fig. 5, to accommodate the movement of the roller in a curved path about the pivotal axis of the axle. One of these tables, with its companion roller, is provided upon each side of the pivot or journal upon which the axle is mounted, and as the axle oscillates the rollers ride on the tables or guides and take up any shocks or strains to which the axle is subjected by the striking of the wheels against stones or other obstructions in the roadway.

Having described my invention, what I claim as new, and desire to secure by Letters Patent, is—

The combination with the vehicle-frame, of a vertically-oscillating pivoted axle consisting of a pair of tubes or bars lying side by side in a horizontal plane, a pair of vertical guides or tables carried on the frame on opposite sides of the journal-pin of the axle, a pair of brackets mounted on the under sides of said pair of tubes, a clamping-plate for each bracket resting on the tops of the tubes and clamped to the bracket, and a pair of rollers, one journaled upon the end of each bracket and adapted to engage and roll upon the respective guides or tables, substantially as described.

In witness whereof I have hereunto subscribed my name in the presence of two witnesses.

THEODORE L. CAMP.

Witnesses:
M. R. ROCHFORD,
R. S. LUDINGTON.